United States Patent [19]

Melacini et al.

[11] 3,966,666

[45] June 29, 1976

[54] CONTINUOUS PROCESS FOR PREPARING A SPINNING SOLUTION OF ACRYLIC POLYMERS

[75] Inventors: Paolo Melacini, Mestre; Luigi Patron; Giorgio Doria, both of Venice; Raffaele Tedesco, Mestre, all of Italy

[73] Assignee: Montefibre S.p.A., Milan, Italy

[22] Filed: June 5, 1974

[21] Appl. No.: 476,698

[30] Foreign Application Priority Data

June 14, 1973  Italy ................................. 50787/73

[52] U.S. Cl. ............................ 260/32.6 N; 264/182
[51] Int. Cl.² ....................... C08K 5/17; D01F 6/18
[58] Field of Search ..... 260/29.6 AQ, 63 N, 88.7 R, 260/29.6 AN, 29.6 AB, 32.6 N; 264/205, 182

[56] References Cited
UNITED STATES PATENTS

| | | | |
|---|---|---|---|
| 3,075,934 | 1/1963 | Grandine et al. ........... | 260/29.6 AQ |
| 3,397,262 | 8/1968 | Stoy et al. ................... | 260/29.6 AB |
| 3,630,986 | 12/1971 | Mison et al. ................ | 260/29.6 AN |
| 3,687,918 | 8/1972 | Calurdann.................... | 260/29.6 AN |
| 3,697,472 | 10/1972 | Champ et al................ | 260/29.6 AN |
| 3,787,365 | 1/1974 | Melacini et al. ............ | 260/29.6 AN |

*Primary Examiner*—Jay H. Woo
*Attorney, Agent, or Firm*—Hubbell, Cohen, Stiefel & Gross

[57] ABSTRACT

Continuous process for preparing a spinning solution of acrylic polymeric material. Process utilizes acrylic polymers obtained in a bulk polymerization slurry, and comprises adding a solvent such as dimethylacetamide to the slurry in such quantity as to be insufficient to attack and dissolve the polymer, bringing the resulting mixture to a temperature not exceeding 170°C, such temperature being such as to not result in any appreciable attack of the polymer by the solvent, removing unreacted monomer by vacuum adiabatic evaporation, and then heating to a temperature not exceeding 170°C, such temperature being sufficiently high to result in solvent attack and dissolution of the polymer.

11 Claims, 2 Drawing Figures

CONTINUOUS PROCESS FOR PREPARING A SPINNING SOLUTION OF ACRYLIC POLYMERS

BACKGROUND OF THE INVENTION

1. Field of the Invention

The present invention relates to a continuous process for preparing a spinning solution of acrylic polymers. More particularly, the invention relates to a continuous process for preparing a spinning solution of acrylic polymers produced by bulk polymerization, and utlizing as the solution solvent, an organic compound such as dimethyl acetamide, dimethyl formamide, ethylene carbonate, dimethyl sulfoxide, etc.

"Acrylic polymers" as that term is used herein, is intended to mean long-chain synthetic acrylonitrile homopolymers or copolymers containing 85% or more by weight of units derived from acrylonitrile and having a numerical molecular weight of at least 20,000 but preferably not in excess of 60,000. If an acrylonitrile copolymer is employed, then the remainder comprises units derived from at least one other ethylenically unsaturated monomer that is copolymerizable with acrylonitrile.

2. Description of the Prior Art

As is well known, acrylic polymers may be prepared by suspension polymerization, solution polymerization, or bulk polymerization.

Polymerization processes conducted in an aqueous suspension offer the advantages of a relatively high polymerization rate and that of providing a resulting polymeric material which exhibits desirable qualities, such as, e.g., a high degree of purity, whiteness, etc.

However, the necessity of obtaining the polymer in the dry state so as to utilize it in a spinning step with organic solvents, requires complex, tedious, and expensive operations, such as filtration, drying and grinding. The dried polymer is dissolved in the spinning solvent by successive incremental addition of the polymer under stirring.

When polymerization is carried out in solution, it is necessary to operate with a highly viscous medium in the polymerization reactor. The high viscosity of the medium limits the heat exchange co-efficient and, as a result, the reactor dimensions. Moreover, since the polymeric solution is very viscous, separation of that portion of the monomer which is not converted into polymer must be carried out in special, complex, complicated apparatus.

As is well known, in the bulk polymerization of acrylonitrile one operates in the absence of both water and solvent. According to this technique, and where the polymer is to be employed for producing fibers, films, and other shaped articles, the reaction mass leaving the reactor must be subjected to a mechanical separation of polymer from monomer (centrifuging and/or filtration), and the polymer is thereafter dried, ground and dissolved in the solvent.

SUMMARY OF THE INVENTION

The present invention provides a continuous process for directly obtaining the desired spinning solution from the polymerization slurry obtained via bulk polymerization, without carrying out any mechanical separation of polymer from monomer and without either drying or grinding of the obtained polymer.

The process of the invention comprises the following steps:

a. adding to the slurry resulting from bulk polymerization, a solvent in such amount as to be insufficient to attack and dissolve the polymer, so as to provide a polymer/monomer/solvent mixture having a viscosity of less than 2 poises;

b. heating the thus obtained mixture to at least room temperature and preferably higher, but not in excess of 170°, and preferably less than 170°C, the temperature being such that the polymer is not substantially attacked by the solvent;

c. removing at least 30% of the unreacted monomer or monomers by one or more vacuum adiabatic evaporation stages;

d. optionally adding a further amount of solvent until the desired polymer concentration is obtained;

e. heating the resulting mixture to a temperature not in excess of 170°, the temperature being such as to cause the solvent to attack and thoroughly dissolve the polymer; and, if necessary, f. completing the removal of residual monomer or monomers, as by evaporation, desirably utilizing a thin film evaporator.

BRIEF DESCRIPTION OF THE DRAWING

The invention will be further understood from the following detailed description, taken in conjunction with the appended drawing wherein.

DESCRIPTION OF PREFERRED EMBODIMENTS

The present process exploits bulk polymerization of acrylonitrile in that it enables one to continuously and directly prepare, in a simple and economically attractive manner, a polymer solution in the spinning solvent. In fact, by operating according to the process described above, removal of unreacted monomer or monomers occurs by simple adiabatic evaporation, yet since the polymer is not yet attacked by the solvent, the mixture remains very fluid. A further advantage of the present process resides in the possibility, if desired, of utilizing the polymerization heat to effect the adiabatic evaporation.

The monomers that are to be removed are, of course, those remaining in the slurry which leaves the reactor after the bulk polymerization process. Such monomers either consist wholly of acrylonitrile (whereby homopolymeric acrylonitrile is obtained), or also further comprise one or more other ethylenically unsaturated compounds copolymerizable with acrylonitrile (whereby an acrylonitrile copolymer is obtained).

Suitable other ethylenically unsaturated compounds include: alkyl-, aryl-, and cycloakyl-acrylates, such as methylacrylate, ethylacrylate, isobutylacrylate, etc.; alkyl-, aryl- and cycloalkyl-methacrylates, such as methylmethacrylate, ethylmethacrylate, butylmethacrylate; unsaturated ketones; vinyl esters such as vinyl acetate, vinyl propionate, etc.; vinyl ethers; vinyl benzene hydrocarbons, such as styrene or vinyl toluene; vinyl or vinylidene halides, such as vinyl or vinylidene chloride, vinyl or vinylidene fluoride, and vinyl or vinylidene bromide; methacrylonitrile; butadiene; and the like.

The amount of solvent to be added to the polymerization slurry in step (a) will depend upon the operative temperature and on the concentration of the unreacted monomer or monomers present in the slurry.

tration of unreacted monomers (acrylonitrile-vinylacetate), are reported in Table 1.

TABLE 1

| Polymerization conversion, % by weight | Monomers concentration, % by weight | Amount (g.) of added solvent per 100 g of slurry | Temperature of the monomer/polymer/solvent °C, mixture | Mixture viscosity before evaporation, poises | MIxture viscosity after evaporation, poises | Amount of evaporation monomer with respect to starting monomer, % | REMARKS |
|---|---|---|---|---|---|---|---|
| 40 | 60 | 229 | 40 | 0.3 | 0.6 | 49 | fluid slurry |
| 40 | 60 | 250 | 40 | 2 | 100 | 6 | dope begins to form during evaporation |
| 40 | 60 | 200 | 40 | 0.1 | 0.3 | 50 | fluid slurry |
| 45 | 55 | 91 | 85 | 0.5 | 3 | 40 | fluid slurry |
| 45 | 55 | 100 | 85 | 3 | ~3,000 | 2 | formation of gel that was not processable |
| 45 | 55 | 80 | 85 | 0.3 | 1 | 50 | fluid slurry |

Such amount, as previously pointed out, should not be so great as to result in solvent attack on the polymer to cause polymer swelling and/or solubilization so as to form a spinning dope.

Figure 1:
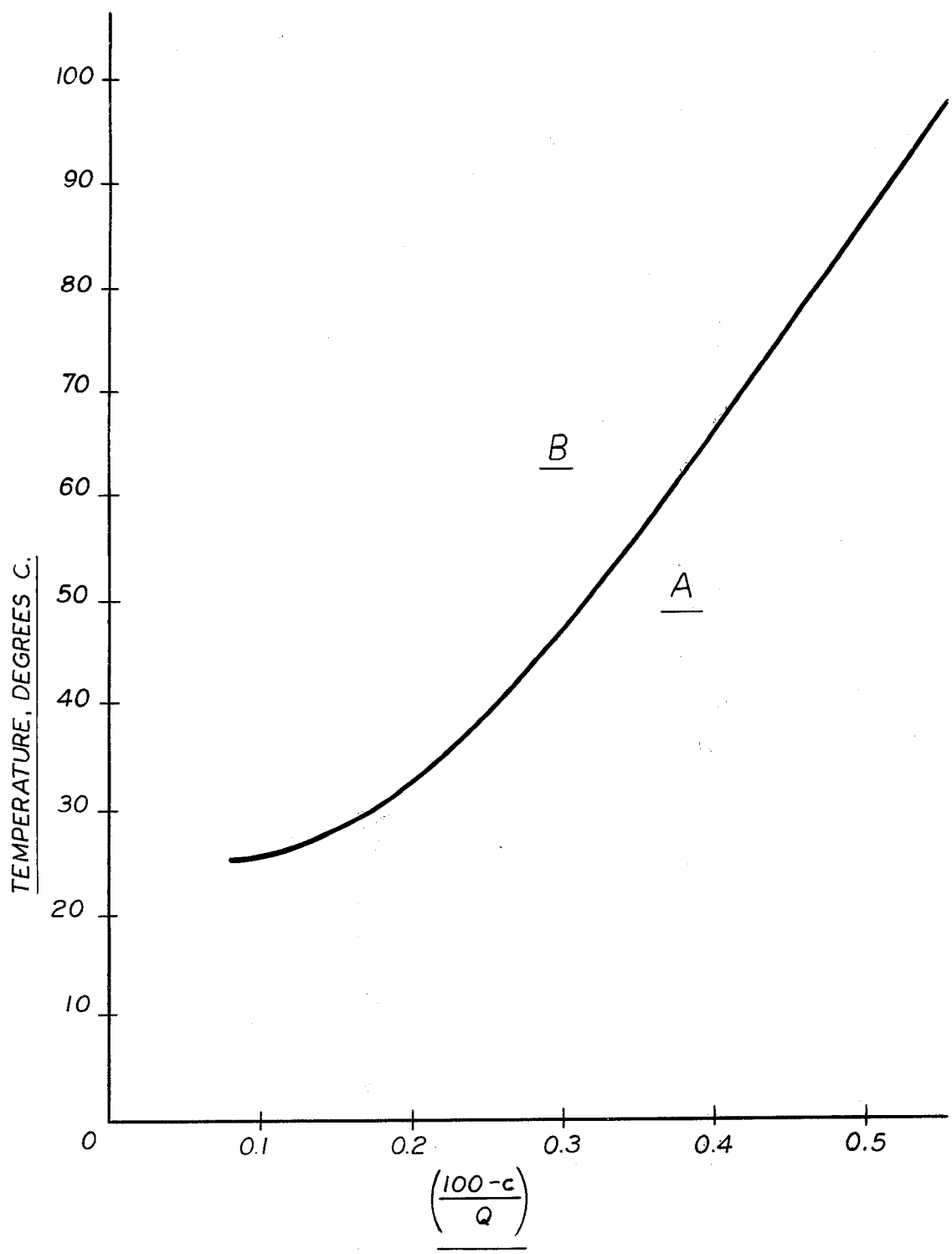
FIG. 1 is a plot illustrating the temperature at which dissolution of the polymer commences, as a function of monomer concentration.

Referring to the drawing, FIG. 1 is a curve representing the temperature at which the dissolution of the polymer begins, as a function of the monomer concentration, referred to the solvent (100−c)/Q, wherein "c" is the degree of conversion of monomers to polymer, expressed in percent by weight with respect to the fed monomer or mixture of monomers, and "Q" is the amount, by weight, of solvent per 100 parts of polymerization slurry. In the case illustrated in FIG. 1, dimethylacetamide is the solvent.

The temperature at which polymer dissolution begins, for each (100−c)/Q value, was determined using a rotary blade viscosimeter and heating the sample at the rate of 1°C per minute. Thus, for each sample, a viscosity-temperature curve is obtained, which exhibits a typically stepped trend. That value in closest proximity to the first sudden variation in viscosity is assumed to be the initial temperature at which polymer dissolution commences.

In such curve, therefore, "A" represents the zone in which the polymer/monomer/solvent mixture is fluid, i.e., the polymer is not attacked by the solvent; and "B" represents the zone in which the mixture is "thick" or viscous due to attack of the polymer by the solvent, with progressive dissolution of the polymer.

With a view to keeping such mixture fluid during adiabatic evaporation, it has been experimentally ascertained that, when dimethylacetamide is used as the spinning solvent, the quantity (Q) of solvent to be added to the polymerization slurry is given by the formula:

$$Q \leqslant \left(\frac{265}{T+15} - 1\right)(100-c) \quad (1)$$

wherein "Q" is the amount of solvent by weight per 100 parts of slurry, "T" is the temperature of the solvent/slurry mixture in °C, and "c" is the polymerization conversion expressed in percent by weight with respect to the fed monomer or mixture of monomers.

The viscosity of the polymer/monomer/solvent mixture before and after adiabatic evaporation; the processability of such mixture; and the amount of evaporated monomer as a function of the amount of added solvent, of the mixture temperature, and of the concentration of unreacted monomers (acrylonitrile-vinylacetate), are reported in Table 1.

Based on the data in Table 1, it is seen that the quantity (Q) of solvent to be admixed to the polymerization slurry is critical, in the sense that if an amount of solvent greater than that defined in formula (1) is added, the slurry changes into a dope or even into a gel which is no longer processable, and the amount of monomer removed by adiabatic evaporation is lower than 30% by weight of the starting monomer. In this case, of course, the remaining amount of monomer must be removed by evaporation, as by the use of a thin film evaporator, such operation, as is well known, being very slow and expensive.

Adiabatic evaporation is conducted so as to result in a residual pressure lower than 100 mm Hg and preferably from about 5 to 50 mm Hg.

Additional solvent may then be added, if the percentage of solids becomes too high. The solvent may be added at any temperature, most preferably at about room temperature.

After addition of the solvent, the mixture is heated, in order that the solvent attack and dissolve the polymer so as to form a spinning dope. The heating is advantageously effected by passing the mixture through a heat exchanger.

The temperature at which the mixture is heated should not exceed 170°C, and preferably is from about 70° to 100°C.

An optional final evaporation may be conducted, as by utilizing a thin film evaporator of the standard type, at a temperature of from about 50° to 120°C.

A preferred practice of the present invention provides a continuous process for the preparation of the spinning solution, which process comprises the following steps:

a. adding dimethyl acetamide to the polymerization slurry leaving the reactor in an amount as indicated by formula (1) hereinabove;

b. conveying the resulting slurry/solvent mixture through a heat exchanger to heat the mass to a temperature of from 60° to 120°C, if the mass is not yet within such temperature range;

c. subjecting the heated mass to adiabatic evaporation at room temperature until a residual pressure of from about 5 to 50 mm Hg is attained;

d. optionally adding further solvent to the mixture in such amount as to obtain a slurry having a polymer concentration, with respect to the solvent, of from 15 to 25 percent by weight;

e. converging and resulting slurry through a heat exchanger until a temperature of from 70° to 100°C has been attained and, if necessary, f. removing residual monomer or monomers by evaporation utilizing a film thin evaporator.

The polymer solutions prepared according to this invention may be transformed into filaments or fibers by the usual methods, i.e., by wet or dry spinning. The filaments or fibers thus obtained exhibit excellent whiteness and very good thermal stability.

Figure 2:
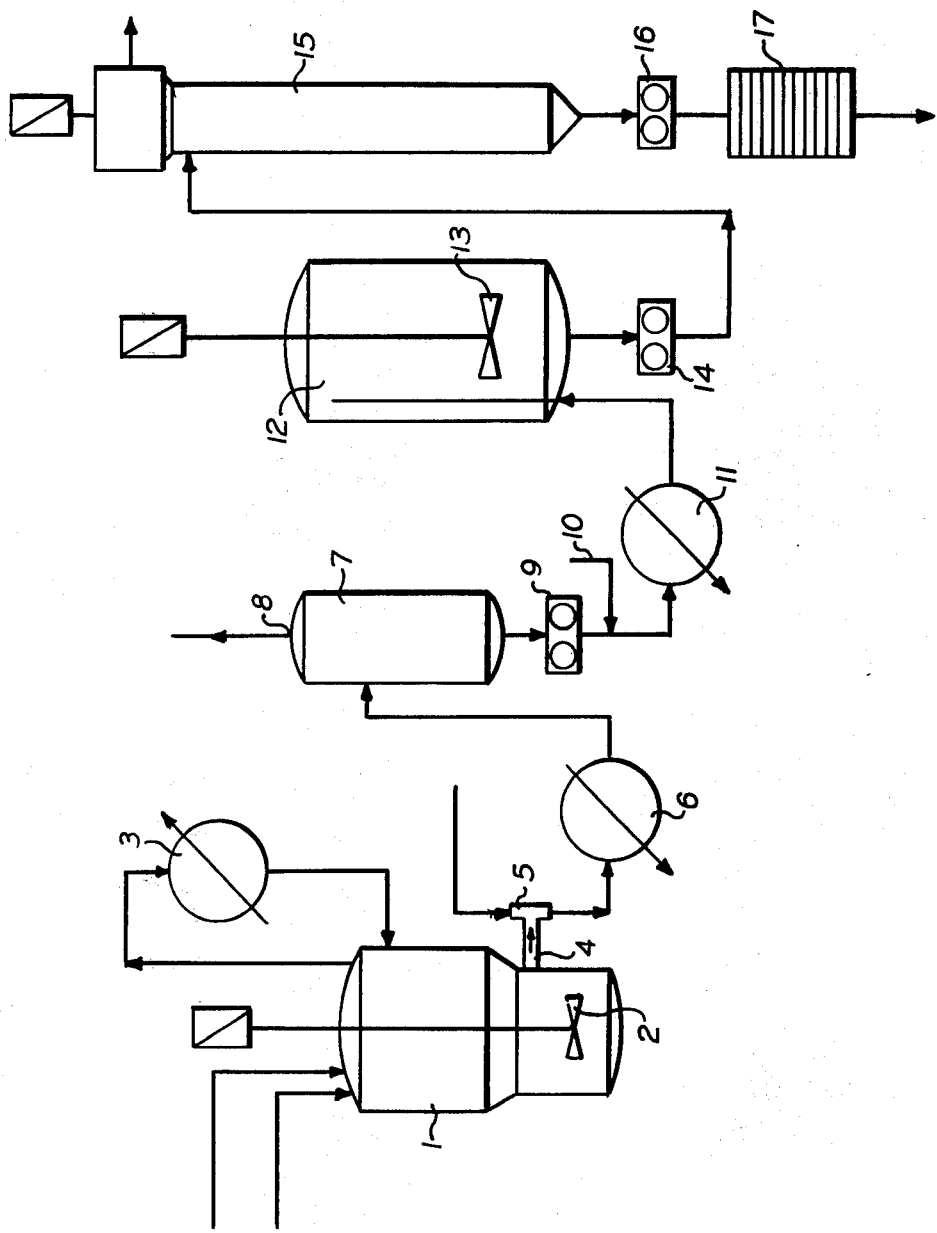
FIG. 2 is a schematic illustration of a suitable apparatus for carrying out the process of this invention.

The following example is given to further illustrate the invention. In such example reference is made to FIG. 2 which is a schematic illustration of suitable apparatus that may be used in the process of this invention.

EXAMPLE 25 g/h of cumene hydroperoxide, 50 g/h of gaseous $SO_2$, and 10 g/h of 2-mercaptoethanol were each continuously and separately fed, at room temperature, to a polymerization reactor 1 having a capacity of 2,000 cc, provided with a stirrer 2, thermometer (not shown), cooler-condenser 3, and overflow pipe 4, precharged to overflow with a mixture consisting of 72% of acrylonitrile monomer, 23% of vinyl acetate monomer, and 5% of $SO_2$. (Water content in the mixture = 0.3%).

After the first 10 minutes, a monomer mixture made up of 83% of acrylonitrile and 17% of vinyl acetate, containing 0.1% of dimethylacetamide in the dissolved state, was fed at a flow rate of 10,000 grams per hour. The polymerization temperature was 75°C and the heat generated was entrained by the evaporating reaction mixture. The condensed steam flowed back to the reactor 1.

Under stationary (equilibrium) conditions, a slurry flowed from the overflow pipe 4, this slurry having a polymer content of 42% by weight, with the remaining portion consisting of the following mixture of monomers: vinyl acetate and acrylonitrile in a ratio of 24% and 76%, respectively.

The slurry was mixed with dimethylacetamide, which was fed, at outlet 5 of the overflow pipe, at room temperature and at a flow rate of 9,500 grams per hour.

The thus obtained mixture, which had a viscosity of 0.5 poise, was flowed through heat exchanger 6 wherein it was heated to 83.5°C.

This mixture was fed, at a flow rate of 19,500 grams per hour, to an insulated tank 7 which was maintained at a pressure of 20 mm Hg. By adiabatic evaporation of monomers, the temprature of the mixture dropped to 30°C.

The condensed monomers, made up of 62% acrylonitrile, 25% vinyl acetate, 11.5% dimethylacetamide, with the remainder being water and $SO_2$, flowed from the top 8 of the insulated tank at a flow rate of 4,700 grams per hour.

The evaporated mixture, which had a viscosity of 3 poises, was withdrawn from tank 7 by gear pump 9 at a flow rate of 14,800 grams per hour. To this mixture was added dimethylacetamide fed from pipe 10 at a flow rate of 7,840 grams per hour. The mixture was then flowed through heat exchanger 11 in which it was heated to 80°C. The solution thus obtained was introduced into tank 12, which was provided with a stirrer 13, and was then fed, by gear pump 14, to the top of thin-film evaporator 15 to effect thorough removal of the monomers.

In evaporator 15 the pressure was 50 mm Hg and the temperature was 90°C. The solution remained in the evaporator for an average time period of 30 to 60 seconds.

The solution, upon leaving the evaporator, had a solids concentration of 25%, a viscosity of 150 poises, and was essentially free of monomers.

Such solution was fed by means of gear pump 16 to filter 17 and then to the spinneret of the spinning device, and was thus transformed into filaments according to known spinning techniques.

Variations can, of course, be made without departing from the spirit and scope of the invention.

Having thus described the invention, what is desired to be secured by Letters Patent and hereby claimed is:

1. A continuous method for preparing a spinning solution of acrylic polymers directly from an acrylonitrile polymerization slurry obtained by bulk polymerization, this method comprising,
   a. adding to said polymerization slurry a solvent in such quantity as to be insufficient to attack and dissolve the polymer and to result in a polymer/monomer/solvent mixture having a viscosity less than 2 poises;
   b. bringing the resulting mixture to a temperature (T) exceeding room temperature and not exceeding 170°C, said temperature (T) being such that there is no appreciable attack of the polymer by the solvent;
   c. removing at least 30% of unreacted monomer or monomers by vacuum adiabatic evaporation; and
   d. heating the resulting mixture to a temperature not exceeding 170°C, said temperature being such as to result in said solvent attacking and completely dissolving the polymer.

2. The method of claim 1 wherein, after step (c) and prior to step (d), additional solvent is added so as to obtain the desired polymer concentration.

3. The method of claim 1 wherein, after step (d), any residual monomer is removed by evaporation utilizing a thin-film evaporator.

4. The method of claim 1 wherein said solvent is dimethylacetamide and wherein the amount added during step (a) is defined by the formula:

$$Q \leq \left(\frac{265}{T+15} - 1\right)(100 - c)$$

wherein Q is the amount of solvent by weight per 100 parts of slurry, T is the temperature in °C of the solvent/slurry mixture, and c is the degree of conversion of monomer to polymer expressed in percent by weight with respect to the fed monomer.

5. The method of claim 1 wherein said adiabatic evaporation is carried out to a residual pressure less than 100 mm Hg.

6. The method of claim 5 wherein said adiabatic evaporation is carried out to a residual pressure of from 5 to 50 mm Hg.

7. The method of claim 1 wherein the temperature employed in step (d) is from 70° to 100°C.

8. The method of claim 3 wherein said evaporation is carried out at a temperature of from 50° to 120°C.

9. The method of claim 1 wherein, in step (a) said solvent is dimethylacetamide, wherein the temperature utilized in step (b) is 60°C–120°C, wherein the adiabatic evaporation is carried out until room temperature is attained and a residual pressure of 5–50 mm Hg is attained, and wherein the heating in step (d) is to a temperature of from 70°C to 100°C.

10. The method of claim 9 wherein, after step (c) and prior to step (d), additional solvent is added in such amount as to obtain a slurry having a polymer concentration of from 15 to 25 percent by weight based on said solvent.

11. The method of claim 10 wherein after step (d), any residual monomer is evaporated by means of a thin film evaporator.

* * * * *

UNITED STATES PATENT OFFICE
CERTIFICATE OF CORRECTION

Patent No. 3,966,666　　　　　　　　Dated June 29, 1976

Inventor(s) PAOLO MELACINI et al

It is certified that error appears in the above-identified patent and that said Letters Patent are hereby corrected as shown below:

Column 1, line 44: "co-efficient" should read -- coefficient --.

Column 2, line 56: "cycloakyl-acrylates" should read -- cycloalkyl-acrylates --.

Column 5, line 1: "converging and resulting" should read -- conveying the resulting --.

Signed and Sealed this

Seventh Day of September 1976

[SEAL]

Attest:

RUTH C. MASON　　　　　　　　　C. MARSHALL DANN
Attesting Officer　　　　　　　　Commissioner of Patents and Trademarks